W. C. Bibb,
Walking Planter.
No. 113,482. Patented Apr. 11, 1871.
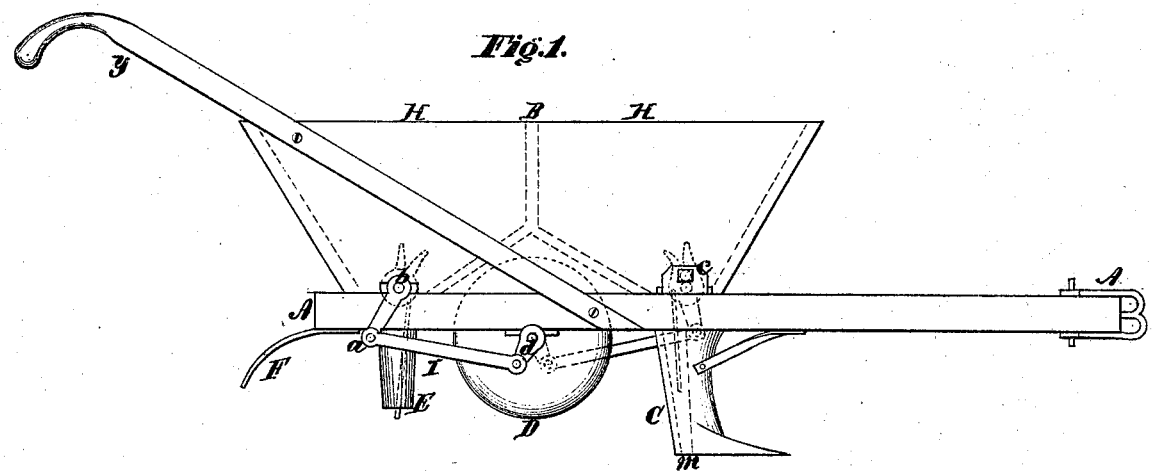
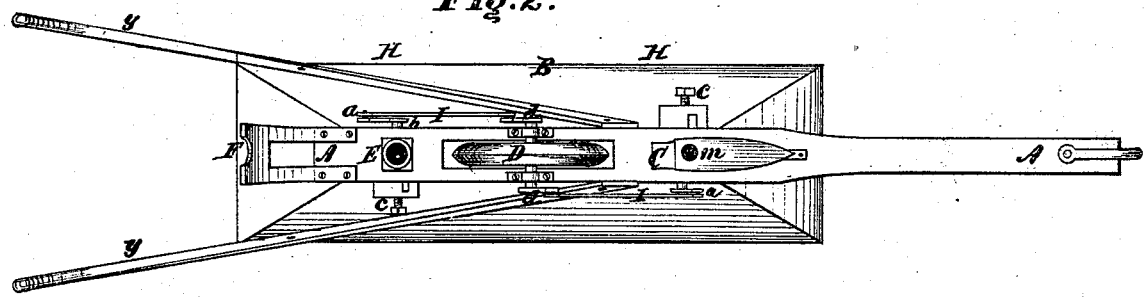
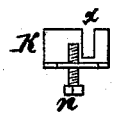
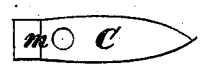
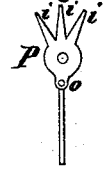
Witnesses.
Albert E. Andrews.
Charles H. Andrews.
Inventor.
William C. Bibb.

UNITED STATES PATENT OFFICE.

WILLIAM C. BIBB, OF MADISON, GEORGIA.

IMPROVEMENT IN COMBINED PLOWS AND SEEDERS.

Specification forming part of Letters Patent No. 113,482, dated April 11, 1871.

I, WILLIAM C. BIBB, of the city of Madison, in the county of Morgan, and the State of Georgia, have invented certain Improvements to be attached to a subsoil-plow, for the purpose of subsoiling the ground, distributing the fertilizer in the bottom of the furrow, covering the same at a certain depth, opening a furrow, sowing the cotton-seed or other seed to be planted in drills, and covering the same, so that the fertilizer and seed shall not be in contact, all to be done at one and the same operation.

The first part of my invention is the attachment of a double hopper on the beam of an ordinary subsoil-plow. This hopper is so adjusted and divided that the front division or apartment comes directly over the plow, (iron or steel,) and is so arranged that, by the assistance of other machinery, the fertilizer is caused to descend through a hollow space running lengthwise through the subsoil-plow, and is deposited in the bottom of the furrow made by the same, and immediately under it. This plow is followed by a beveled wheel, (iron or wood,) which presses the earth above the fertilizer, and at the same time opens a straight furrow or channel, with compacted sides, for the reception of the seed.

The rear apartment of the double hopper contains the seed to be sown, which is distributed by machinery within, actuated by machinery from without, in like manner, and causes the seed to descend through a spout of wood or metal into the furrow opened by the wheel in front of spout and rear of subsoil-plow.

On the rear end of the plow-beam is attached a board or harrow, by means of strips of iron, which, following, covers the seed, and thus the whole operation is performed at one and the same time.

The second part of my invention is the application of a hollow subsoil-plow for the distribution of fertilizers, in conjunction with the hopper to contain the same.

The third part of my invention is the use of a beveled wheel, (of wood or iron,) for the double purpose of covering the fertilizer and opening a drill for the sowing of cotton or other seed, which wheel is fixed upon its axle firmly, and to which are attached, on either side, a crank and connecting-rod, which actuates the machinery by means of another crank, and causes the seed and fertilizer to descend to the desired place of deposit in the furrows, respectively.

The fourth part of my invention is a rod pendent from the shaft of the feeders contained in each of the apartments of the double hopper, and which are caused to play up and down through the tubes or hollows both of the plow and seed-spout, by which they are kept free from clogging.

*Description of my Invention of a Subsoiler, Fertilizer, Distributer, and Seed-Sower Combined.*

Figure 1 is a side elevation of the machine.

A A is the beam of the plow, in which the subsoil-plow C is firmly fixed. D is a beveled wheel immediately in the rear of the plow C, which has a shaft passing through its center, to which it is immovably fixed. On either end of this shaft is a crank, $d$, to each of which is attached a connecting-rod, I. On one side of the machine this rod connects with a larger crank at $a$, which is attached at $b$ to an axle passing through the seed-box, and used to compel the seed, by the means of the device represented in Fig. 5, to descend through the hopper E. On the other side is a similar attachment, but passing to the front hopper, and in like manner compelling the fertilizer to descend through the plow into the furrow beneath.

F is a seed-coverer, attached to rear end of the beam A A. E is the seed-spout, through which the seed is carried into the furrow opened by the wheel D. C is a contrivance for regulating the feed by sliding in or out, as the quantity of seed or fertilizer is desired to be increased or diminished, and is more distinctly shown in Fig. 4, K.

Fig. 4—$n$ is a thumb-screw for moving K, Fig. 4, in or out. Fig. 4—$x$ is a slot, intended only to give a place for the shaft which runs through the box to work without pressure.

Fig. 1—$m$ is the point where the fertilizer is emptied into the furrow beneath the plow. Fig. 3—C is a view of the bottom of the foot of the subsoil-plow, showing the opening. Fig. 2 is a bottom view of my machine, and is intended to give a plainer view than could be made in a side elevation.

Having described my invention, what I desire to secure by Letters Patent is—

The beveled wheel D, actuating the seeding and fertilizing devices by cranks I I, in combination with the plow C and seed-spout E, substantially as and for the purpose set forth.

WILLIAM C. BIBB.

Witnesses:
F. C. FOSTER,
T. W. S. BROBETAN.